United States Patent [19]

Russell et al.

[11] Patent Number: 4,665,323
[45] Date of Patent: May 12, 1987

[54] ELECTRONICALLY SWITCHABLE POWER SOURCE

[75] Inventors: Randy Russell, Northbrook; Wayne F. Salata, Chicago; Dennis L. Stephens, Niles, all of Ill.

[73] Assignee: Zenith Electronics Corporation, Glenview, Ill.

[21] Appl. No.: 664,655

[22] Filed: Oct. 25, 1984

[51] Int. Cl.⁴ .......................... H02J 3/04; H02M 7/00
[52] U.S. Cl. .................................. 307/75; 307/86; 363/60; 363/61; 363/142; 363/143; 323/300
[58] Field of Search ............... 307/4, 72, 86, 75, 43; 363/59, 60, 61, 78, 79, 80, 142, 143, 164; 323/300

[56] References Cited

U.S. PATENT DOCUMENTS

| 3,737,758 | 6/1973 | Allington | 363/60 X |
| 3,737,761 | 6/1973 | Walther | 307/75 X |
| 3,815,009 | 6/1974 | Berger | 363/142 X |
| 3,851,182 | 11/1974 | Wallace | 363/60 X |
| 3,962,591 | 6/1976 | Popka | 363/60 X |
| 4,167,777 | 9/1979 | Allington | 363/61 |
| 4,268,899 | 5/1981 | Rokas | 363/61 |
| 4,315,305 | 2/1982 | Siemon | 323/300 X |
| 4,380,730 | 4/1983 | Morton | 323/300 |
| 4,415,964 | 11/1983 | Scharfe | 363/142 |
| 4,437,146 | 3/1984 | Carpenter | 363/79 X |

FOREIGN PATENT DOCUMENTS

| 0162881 | 12/1980 | Japan | 363/143 |
| 0111920 | 9/1981 | Japan | 363/61 |
| 0212370 | 12/1983 | Japan | 363/59 |
| 0067873 | 4/1984 | Japan | 363/143 |
| 2104737 | 3/1983 | United Kingdom | 363/61 |

OTHER PUBLICATIONS

"Design Ideas" by EDN (Jan. 21, 1981) vol. 26, No. 2.
IBM Technical Disclosure Bulletin, vol. 27, No. 10B Mar. 1985, p. 6214.
IBM Technical Disclosure Bulletin, vol. 23, No. 1, Jun. 1980, p. 46.

Primary Examiner—William M. Shoop, Jr.
Assistant Examiner—Shik Luen Paul Ip

[57] ABSTRACT

A DC power source is capable of automatically adapting to either a 120 or 240 VAC input and of providing a single regulated output range for either of the AC voltage levels provided thereto. The power source detects the AC input voltage and automatically doubles the lower voltage while allowing the higher rectified voltage to pass through. The power source includes an electronic switching arrangement responsive to the input voltage level for automatically doubling the lower AC input voltage when detected as well as timing circuitry to allow for transitory fluctuations in the input voltage level while maintaining a level DC output voltage.

8 Claims, 2 Drawing Figures

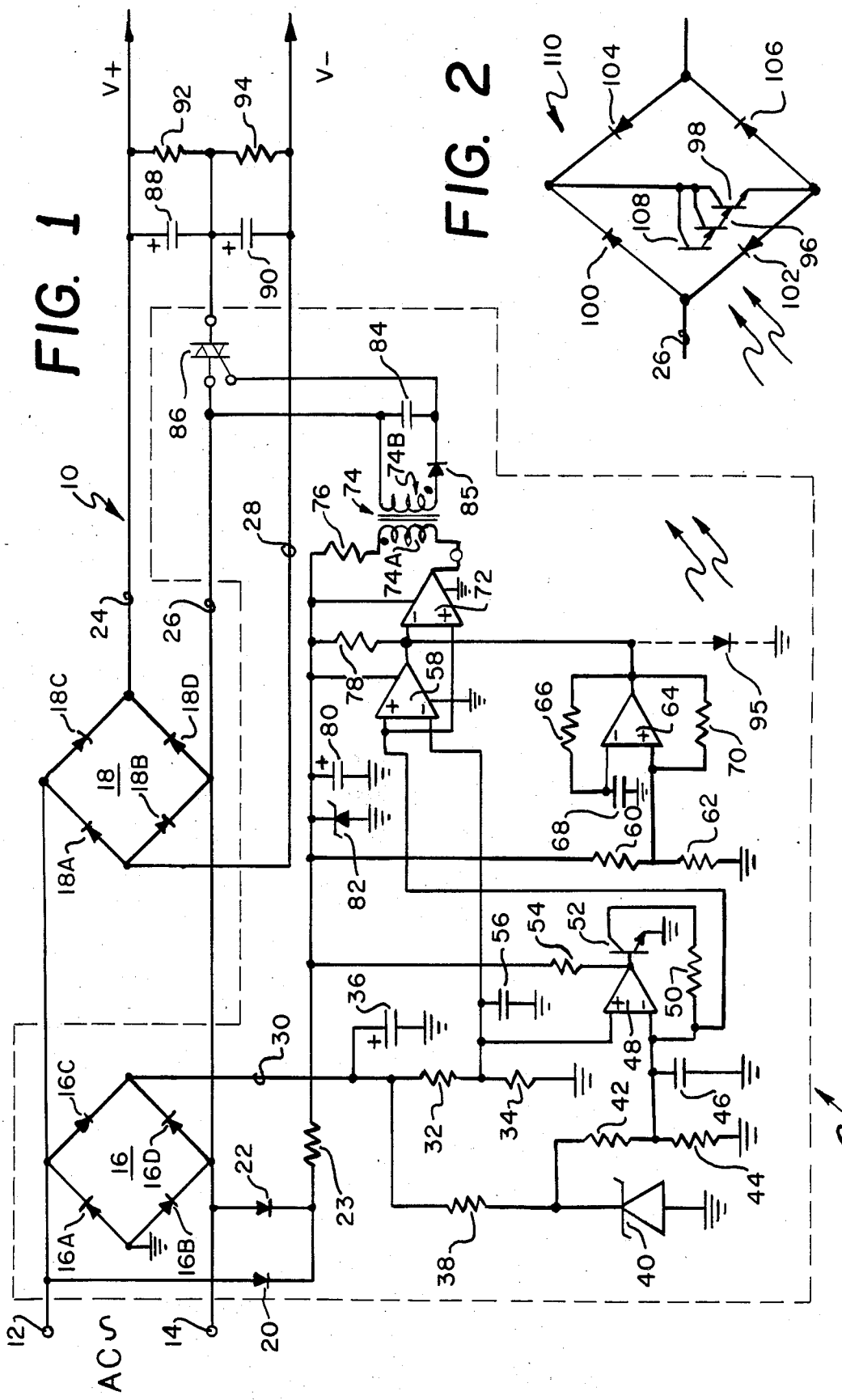

ELECTRONICALLY SWITCHABLE POWER SOURCE

BACKGROUND OF THE INVENTION

This invention relates generally to DC power sources and is specifically directed to a DC power source capable of automatically accommodating either a 120 or 240 VAC input.

Most DC power sources are adapted to operate from a 120 volt AC line input. To permit the DC power source to operate from a 240 VAC line, a manual switch is generally provided for selecting either the lower or upper voltage mode of operation. It would be desirable to provide this dual voltage operating capability without requiring a manual switch operation on the part of the user. For example, the necessity to switch between different input voltage levels is easily overlooked and may result in damage to or destruction of an expensive component, device or system. The risk increases substantially where the DC power source energized by an AC line voltage is used to drive a sophisticated microcomputer terminal.

In addition, from a manufacturing standpoint it would be desirable to produce a DC power source capable of operating at either the conventional U.S. AC voltage of 120 volts or the 240 volt standard used generally throughout the rest of the world. A DC power source capable of accommodating both AC voltage levels without requiring operator intervention would also, in addition to eliminating the aforementioned over voltage hazards, eliminate the need for a manual switch in reducing the complexity of the power source.

The present invention affords the aforementioned advantages of an AC-energized DC power source which is equally compatible with both 120 or 240 VAC inputs in providing an automatic electronic switching arrangement to accommodate both input voltage levels.

OBJECTS OF THE INVENTION

Accordingly, it is an object of the present invention to provide a DC power source capable of automatically accommodating either a 120 or a 240 VAC input.

It is another object of the present invention to provide a constant DC power source output capable of operating at a first lower and a second higher input voltage by means of an automatic voltage incrementing function when the first lower input voltage is detected.

Another object of the present invention is to provide a DC power source adapted for use anywhere in the world which affords increased safety.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a schematic diagram of one embodiment of an electronically switchable power source in accordance with the present invention; and FIG. 2 is a schematic diagram of a second switch arrangement for use in the electronically switchable power source of FIG. 1.

DETAILED DESCRIPTION OF THE PREFERRED EMBODIMENT

Referring to FIG. 1, there is shown a schematic diagram of an electronically switchable power source 10 in accordance with the present invention. The electronically switchable power source 10 includes a switching control circuit 11 for automatically detecting the AC input voltage and providing a predetermined, level DC output voltage.

An AC input is provided to the electronically switchable power source 10 via input terminals 12 and 14. The electronically switchable power source 10 includes a main rectifying bridge 18 coupled to the input terminals 12 and 14 for rectifying the AC input voltage and providing a DC voltage to the parallel, respective combinations of bulk capacitor 88, resistor 92 and bulk capacitor 90, resistor 94. The main bridge 18 is comprised of a plurality of diodes 18A–18D and is coupled by means of a switching device in the form of a triac 86, as shown in FIG. 1, to the aforementioned combination of bulk capacitors and coupled resistors. The triac 86 is incorporated within the switching control circuit 11 and its operation therein is described in detail below. The manner in which the combination of main bridge 18, triac 86, and the aforementioned bulk capacitors and coupled resistors provides a voltage doubling capability is described in the following paragraphs.

With a 240 VAC input provided to terminals 12 and 14, the triac 86 is switched off by means of the switching control circuit 11 as described below and the AC input voltage is rectified in the following manner. Diode 18C is rendered conductive during the positive portion of the AC input signal to the main bridge 18, with current traveling via line 24, the series combination of capacitors 88 and 90, and line 28 back via diode 18B in the main bridge 18 to the AC input line. During the negative portion of the AC input cycle, diodes 18D and 18A are rendered conductive for providing, via the series coupled capacitors 88 and 90, a return path to the AC input line. With the triac 86 open, each of the bulk capacitors 88 and 90 is charged during a respective ½ positive or negative swing of the AC input voltage, with the current returning to the input line via the other capacitor and each capacitor charged to ½ the DC output voltage. In this mode of operation, the combination of the main bridge 18 and bulk capacitors 88, 90 and resistors 92, 94 perform a 1:1 alternating voltage conversion and rectification function.

In the voltage doubling mode of operation with a 120 VAC input provided to terminals 12 and 14, the triac 86 is rendered conductive, or switched on, by the switching control circuit 11 as described below. With triac 86 conductive, current during the positive portion of the AC input signal flows via diode 18C, line 24, capacitor 88, triac 86 and line 26 to the AC return line. In the negative portion of the AC cycle current flows via line 26, triac 86, capacitor 90, line 28, and diode 18A to the AC return line coupled to terminal 12. In this manner, capacitors 88 and 90 are charged during alternate cycles of the AC input signal, with capacitor 88 charged during the positive portion of the cycle and capacitor 90 charged during the negative portion of the cycle, resulting in a doubling of the DC output voltage. Thus, with triac 86 conductive, the bulk capacitors 88 and 90 are charged in parallel in respective ½ cycles of the AC input signal in providing an essentially doubled DC output voltage relative to a normal AC bridge rectified DC output voltage.

The switching control circuit 11 not only includes triac 86, but also a detector bridge 16 comprised of diodes 16A through 16D. The detector bridge 16 is also coupled across the input terminals 12 and 14 and provides a rectified DC output voltage, the magnitude of which is determined by the AC input voltage. For example, a low DC output voltage will be provided by the detector bridge 16 on line 30 in response to receipt of a 120 VAC input, while a high DC output voltage will be provided on line 30 by the detector bridge 16 in response to receipt of a 240 VAC input. The rectified output of the detector bridge 16 is provided, after being divided down by resistors 32 and 34 and filtered by grounded capacitors 36 and 56, to the positive input of a first comparator 48 and the negative input of a second comparator 58.

The output of the detector circuit 16 is also provided via a biasing resistor 38 to the cathode of a grounded Zener diode 40. The Zener diode 40 serves as a fast acting reference voltage source and is coupled via voltage dividing resistors 42, 44 and grounded filter capacitor 46 to the negative input of the first comparator 48. The first comparator 48 thus compares the divided down rectified DC output of the detector bridge 16 with a reference voltage. Thus, if the voltage provided to the positive input of comparator 48 exceeds the voltage provided to the negative input thereof, the first comparator 48 will turn on, with its output pulling the base of NPN transistor 52 high in rendering it conductive. Zener diode 40 is selected in providing a reference voltage to the first comparator 48 such that the first comparator will conduct when a 240 VAC input is provided to the detector bridge 16.

A biasing voltage is provided to the base of NPN transistor 52 from the AC input line via rectifying diodes 20 and 22, current limiting resistor 23, and biasing resistor 54. The collector of NPN transistor 52 is coupled via resistor 50 in a positive feedback arrangement to the negative input of the first comparator 48. Thus, with the first comparator 48 and NPN transistor 52 conducting, a positive feedback signal is provided to the first comparator 48 for pulling the reference voltage input thereto low. The first comparator 48 and NPN transistor 52 combination will thus continue to conduct for the rest of the cycle of the AC input signal provided across terminals 12 and 14. The output of NPN transistor 52 is also provided to the positive input of the second comparator 58. The first comparator 48 and circuitry associated therewith performs a hysteresis function in introducing a predetermined time delay in the switching control circuit 11 in order to prevent rapid switching of the triac 86 in response to temporary, short-termed variations in the AC input voltage. For example, the combination of the first comparator 48 and NPN transistor 52 introduces a time delay in the operation of the switching control circuit 11 to prevent the turn-on of triac 86 if the AC input voltage drops temporarily from 240 VAC to 120 VAC in order to prevent a doubling of the input voltage when the 240 VAC input is restored.

As indicated above, the divided-down, filtered and rectified output of the detector bridge 16 is provided to the negative input of the second comparator 58, while the output of the first comparator 48 and NPN transistor 52 combination is provided to the positive input thereof. In addition, when the first comparator 48 is turned on, the reference voltage is also provided via NPN transistor 52 and resistor 50 to the positive input of a third comparator 72. The second comparator 58 compares the reference voltage output of the first comparator 48 with the input peak pulse from the detector bridge 16. The second comparator 58 is selected so as to conduct when the reference voltage provided to its positive input exceeds the divided-down input voltage provided to its negative input. This corresponds to the receipt of a 120 VAC input at input terminals 12 and 14. Conversely, if the divided down input voltage exceeds the reference voltage from the first comparator 48, the second comparator 58 will be rendered nonconductive.

All four comparators 48, 58, 64 and 72 are powered by the rectifying diodes 20, 22 via the current limiting resistor 23. Comparator 64 in combination with feedback resistors 66, 70 and grounded capacitor 68 along with a voltage dividing pair of resistors 60, 62 for receiving the input voltage from the diodes 20, 22 form an oscillator circuit which, in a preferred embodiment, provides a 100 kHz pulsed output. The output of the oscillator circuit comprised primarily of comparator 64 and the sequential charging and discharging of grounded capacitor 68 is coupled to the output of the second comparator 58 and is provided to the negative input of the third comparator 72 in combination with the output of the second comparator 58. The second and fourth comparators 58, 64 are open collector logic gates and, in combination, function as an AND gate. Thus, with the second comparator 58 conductive, such as when a 120 VAC input is provided to the input terminals 12, 14, the 100 kHz pulses are gated through to the negative input of the third comparator 72. The third comparator 72 functions as a buffer for a coupling transformer 74 which includes a primary winding 74A and a secondary winding 74B. The combination of a grounded capacitor 80 and a grounded Zener diode 82 coupled to the rectifying diodes 20 and 22 provides a regulated and filtered DC voltage and to all circuitry via resistor 76 across the primary winding 74A of the coupling transformer 74. Resistor 78 coupled to the output pin of the fourth comparator 64 ensures that this output is pulled high during the operation of the aforementioned oscillator circuit.

The input voltage is coupled by means of transformer 74 and is provided via filter capacitor 84 and rectifying diode 85 to the gate of triac 86. The pulsed input from the step-up transformer 74 renders the triac 86 conductive causing current to flow through capacitors 88 and 90 and a doubling of the input voltage provided to terminals 12 and 14 as previously described. When the second comparator 58 no longer gates the pulsed output of the oscillator circuit comprised primarily of the fourth comparator 64 through to the third comparator 72 in response to a 240 VAC input provided to input terminals 12 and 14, the coupling transformer 74 no longer provides a pulsed output to the gate of the triac 86 which is thus no longer conductive at the end of the AC ½ cycle and ceases to provide a voltage doubling function. Thus, the power source 10 of the present invention converts 120 and 240 VAC, which each may vary over a range of input voltages, to a single range of DC output voltage corresponding to the 240 VAC input.

Referring to FIGS. 1 and 2, there is shown another embodiment of a switching arrangement for use in the switching control circuit 11 of the present invention. Shown in dotted line form in FIG. 1 is a photodiode 95 coupled to the outputs of the second and fourth comparators 58, 64. As in the first embodiment of the present invention discussed above, the output of the oscillator circuit comprised primarily of the fourth comparator 64 will be gated to the photodiode 95 by means of an output from the second comparator 58. The second comparator 58 will be rendered conductive when a 120 VAC input is provided to the input terminals 12, 14 and the divided down, rectified corresponding DC input is provided to the negative input of the second comparator 58. With the pulsed output of the fourth comparator 64 provided under the control of the output of the second comparator 58 to the anode of the photodiode 95, an optical signal is generated by the photodiode 95. The optical signal from the photodiode 95 is provided to an optical switch 110, shown in detail in FIG. 2, which replaces the triac 86 in the embodiment of FIG. 1. Thus, the third and fourth comparators 72, 64 and circuitry associated therewith as well as the coupling transformer 74 and associated circuitry may be eliminated in the second embodiment of the present invention which makes use of the combination of photodiode 95 and optical switch 110.

The optical switch 110 is coupled directly to the main bridge 18 via line 26. The optical switch 110 includes a bridge circuit comprised of diodes 100, 102, 104 and 106. Coupled across the two branches of the optical switch 110 is the combination of a phototransistor 108 and a Darlington pair comprised of coupled NPN transistors 96 and 98. Receipt by the phototransistor 108 of an optical signal from the photodiode 95 renders the Darlington pair conductive thus coupling the two branches of the optical switch 110. Thus, current flows in ½ cycle of the AC input signal via diode 100, the combination of phototransistor 108 and NPN transistors 96 and 98, and diode 106 to charge capacitor 90. In the other ½ cycle of the AC input signal, current flows via diode 104, the combination of the phototransistor 108 and NPN transistors 96 and 98, and diode 102 in discharging capacitor 88. It is in this manner that capacitors 88 and 90 are sequentially charged for providing a voltage doubling function when the phototransistor 108 is rendered conductive by an optical output from the photodiode 95. Thus, the optical switch 120 provides for a doubling of the rectified 120 VAC input voltage as in the case of the operation of the triac 86 described above.

There has thus been shown an electronically switchable power source capable of automatically switching between 120 and 240 VAC inputs in providing a range of direct voltage outputs. A timing delay is incorporated in the switching control circuit to prevent a doubling of the DC output voltage following a temporary decrease in the AC input voltage from 240 to 120 VAC. In one embodiment, a triac is used as the primary switching device, while in a second embodiment increased isolation is provided by an opto coupler switch arrangement.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A DC power source for providing a single DC output voltage in response to either a first or a second AC input voltage provided thereto, wherein said second AC input voltage is twice said first AC input voltage, said DC power source comprising:

first means for converting an AC input voltage to said power source to a DC voltage;

dual mode voltage conversion means coupled to said first means and responsive to a DC voltage therefrom for either passing a DC voltage through in a first mode of operation or for doubling a DC voltage provided thereto in a second mode of operation;

voltage detection means responsive to said first AC input voltage for generating a control signal in response thereto;

electronic switch means coupled to said dual mode voltage conversion means and to said voltage detection means and responsive to said control signal for automatically rendering said voltage conversion means in said second mode of operation when said first AC input voltage is received by said DC power source in providing a single DC output voltage therefrom; and timing means coupled to said voltage detection means and to said switch means for delaying the transition of said voltage conversion means to said second mode of operation when the input voltage decreases from said second to said first AC voltage, wherein said timing means includes a hysteresis feedback control loop for delaying the transition of said voltage conversion means from said first to said second mode of operation for ½ cycle of the AC input voltage and preventing operation of the DC power source in said second mode of operation for short-termed variations in the AC input voltage.

2. A DC power source in accordance with claim 1 wherein said voltage conversion means includes first and second capacitors coupled in series in said first mode of operation and in parallel in said second mode of operation.

3. A DC power source in accordance with claim 1 wherein said switch means comprises a triac.

4. A DC power source in accordance with claim 3 further comprising a coupling transformer coupling said voltage detection means to said triac.

5. A DC power source in accordance with claim 1 wherein said switch means includes an opto coupler.

6. A DC power source in accordance with claim 5 wherein said opto coupler includes the combination of a photodiode and a phototransistor optically coupled thereto.

7. A DC power source in accordance with claim 1 wherein said voltage detection means includes second means for converting an AC input voltage to said power source to a DC voltage.

8. A DC power source in accordance with claim 7 wherein said voltage detection means further includes a DC reference voltage source and means for comparing the converted AC input voltage with a DC reference voltage.

* * * * *